(12) United States Patent
Koda et al.

(10) Patent No.: US 11,691,578 B2
(45) Date of Patent: Jul. 4, 2023

(54) VEHICLE CONTROL DEVICE, VEHICLE CONTROL METHOD, AND RECORDING MEDIUM

(71) Applicant: HONDA MOTOR CO., LTD., Tokyo (JP)

(72) Inventors: Yujiro Koda, Wako (JP); Masashi Sugita, Wako (JP); Shinichi Ueda, Wako (JP); Seonghun Lee, Wako (JP); Katsuyasu Yamane, Wako (JP); Takayuki Furui, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 130 days.

(21) Appl. No.: 17/196,427

(22) Filed: Mar. 9, 2021

(65) Prior Publication Data

US 2021/0291764 A1    Sep. 23, 2021

(30) Foreign Application Priority Data

Mar. 18, 2020 (JP) .................................. 2020-048068

(51) Int. Cl.
*B60R 16/03* (2006.01)
*B60R 16/023* (2006.01)

(52) U.S. Cl.
CPC .......... *B60R 16/03* (2013.01); *B60R 16/0232* (2013.01)

(58) Field of Classification Search
None
See application file for complete search history.

(56) References Cited

U.S. PATENT DOCUMENTS

| | | | |
|---|---|---|---|
| 2004/0100148 A1* | 5/2004 | Kindo ................ | B60R 16/0315 307/66 |
| 2015/0084411 A1* | 3/2015 | Cho ..................... | H02J 1/14 307/10.1 |
| 2018/0265020 A1* | 9/2018 | Aoyagi ................ | B60R 25/24 |
| 2019/0031126 A1* | 1/2019 | Kawauchi ............ | B60R 16/03 |
| 2020/0290510 A1* | 9/2020 | Ohara .................. | B60Q 9/00 |

FOREIGN PATENT DOCUMENTS

JP    2009-101778 A    5/2009

* cited by examiner

*Primary Examiner* — Rexford N Barnie
*Assistant Examiner* — Terrence R Willoughby
(74) *Attorney, Agent, or Firm* — Rankin, Hill & Clark LLP (57) ABSTRACT

A vehicle control device includes: a power-supply control unit that sets a power supply to an off state when either a first power-off condition in which a user performs a power-off operation or a second power-off condition in which a first predetermined time elapses from the time when the user U gets off the vehicle with the power supply in an on state is satisfied; and a power-on-condition setting unit that: sets a power-on condition to a first power-on condition, when the power supply is set to the off state because the first power off condition is satisfied; and sets the power-on condition to a second power-on condition that is different from the first power-on condition, when the power supply is set to the off state because the second power off condition is satisfied.

9 Claims, 5 Drawing Sheets

VEHICLE CONTROL DEVICE, VEHICLE CONTROL METHOD, AND RECORDING MEDIUM

INCORPORATION BY REFERENCE

The present application claims priority under 35 U.S.C. § 119 to Japanese Patent Application No. 2020-048068 filed on Mar. 18, 2020. The content of the application is incorporated herein by reference in its entirety.

BACKGROUND OF THE INVENTION

Field of the Invention

The present invention relates to a vehicle control device, a vehicle control method, and a recording medium.

Description of the Related Art

Conventionally, there has been proposed a power supply device for a vehicle such that, when an ignition power supply of the vehicle is detected to be in an on state and a predetermined time elapses after the vehicle is detected to be stopped, the power supply is shut off (See, for example, Japanese Patent Laid-Open No. 2009-101778).

According to the conventional vehicle power supply device, when a user temporarily leaves the vehicle with the power supply of the vehicle in the on state intentionally, the power of the vehicle may be set off against the intention of the user. In this case, when the user returns to the vehicle, the user has to perform an operation of setting the power supply of the vehicle on again, which is troublesome.

The present invention has been made with respect to such a background, and an object of the present invention is to provide a vehicle control device, a vehicle control method, and a recording medium that can facilitate a next operation of power-on by a user when a power supply is set off by control on a vehicle side.

SUMMARY OF THE INVENTION

As a first aspect for achieving the object, there is provided a vehicle control device that controls on and off of a power supply provided in a vehicle, the vehicle control device including: a power-supply control unit that: sets the power supply to an on state when a predetermined power-on condition is satisfied; and sets the power supply in an off state when a first power-off condition or a second power-off condition is satisfied while the vehicle is stopped and the power supply is in the on state, the first power-off condition being a condition in which a predetermined power-off operation is performed by a user of the vehicle, the second power-off condition being a condition in which a first predetermined time elapses from a time when the user gets off the vehicle; and a power-on-condition setting unit that: sets the power-on condition to a first power-on condition, when the power-supply control unit sets the power supply in the off state because the first power-off condition is satisfied; and sets the power-on condition to a second power-on condition, when the power-supply control unit sets the power supply in the off state because the second power-off condition is satisfied, the second power-on condition being different from the first power-on condition.

The vehicle control device may be configured such that the second power-on condition is different from the first power-on condition because a number of determination conditions for the second power-on condition is smaller than a number of determination conditions for the first power-on condition.

The vehicle control device may be configured such that it includes a door-lock-unlocking recognizing unit that recognizes unlocking of a door lock mechanism provided in the vehicle, wherein the power-on-condition setting unit sets the second power-on condition to that the door-lock-unlocking recognizing unit recognizes unlocking of the door lock mechanism.

The vehicle control device may be configured such that it includes a parking-point recognizing unit that recognizes a parking point where the vehicle is stopped, wherein the power-on-condition setting unit sets the second power-on condition to: that the parking-point recognizing unit recognizes that the parking point is at a place other than a home of the user; and that the door-lock-unlocking recognizing unit recognizes unlocking of the door lock mechanism.

The vehicle control device may be configured such that: the power-on-condition setting unit transmits power-on-condition-setting-information to a user terminal, when the power-supply control unit sets the power supply to the off state because the second power-off condition is satisfied; and the power-on-condition setting unit sets the power-on condition to the second power-on condition, when setting-acceptance-information is received from the user terminal, the user terminal being used by the user, the power-on condition setting information inquiring whether to set the power-on condition to the second power-on condition, the setting-acceptance-information allowing setting of the second power-on condition.

The vehicle control device may be configured such that it includes a user recognizing unit that recognizes that the user or a user terminal used by the user exists within a predetermined range around the vehicle, wherein the power-on-condition setting unit sets the second power-on condition to that the user recognizing unit recognizes that the user or the user terminal exists within the predetermined range.

The vehicle control device may be configured such that it includes a user-getting-on recognizing unit that recognizes that the user is in the vehicle, wherein: the power-on-condition setting unit sets the first power-on condition to that a first power-on operation is performed in a state in which the user-getting-on recognizing unit recognizes that the user is in the vehicle; and when the power supply is set to the off state by the power-supply control unit because the second power-off condition is satisfied, and subsequently a second power-on operation is performed during a period from a time point when the power supply is set to the off state until a second predetermined time elapses, the power-supply control unit sets the power supply to the on state regardless of whether or not the user-getting-on recognizing unit recognizes that the user is in the vehicle.

The vehicle control device may be configured such that it includes a passenger recognizing unit that recognizes whether there is a passenger in the vehicle, wherein, when the power supply is set to the off state by the power-supply control unit because the second power-off condition is satisfied, and subsequently the passenger recognizing unit recognizes that a passenger is in the vehicle and the second power-on operation is performed during a period from a time point when the power supply is set to the off state until the second predetermined time elapses, the power-supply control unit sets the power supply to the on state regardless of whether or not the user-getting-on recognizing unit recognizes that the user is in the vehicle.

As a second aspect for achieving the above object, there is provided a vehicle control method that is executed by a computer to control on and off of a power supply provided in a vehicle, the method including a power-supply control step that: sets the power supply to an on state when a predetermined power-on condition is satisfied; and sets the power supply to an off state when a first power-off condition or a second power-off condition is satisfied while the vehicle is stopped and the power supply is in the on state, the first power-off condition being a condition in which a predetermined power-off operation is performed by a user of the vehicle, the second power-off condition being a condition in which a first predetermined time elapses from a time when the user gets off the vehicle; and a power-on-condition setting step that: sets the power-on condition to a first power-on condition, when the power-supply control step sets the power supply to the off state because the first power-off condition is satisfied; and sets the power-on condition to a second power-on condition, when the power-supply control step sets the power supply to the off state because the second power-off condition is satisfied, the second power-on condition being different from the first power-on condition.

As a third aspect for achieving the above object, there is provided a non-transient recording medium on which a vehicle control program is recorded, the vehicle control program causing a computer to function to control on and off of a power supply provided in a vehicle, the computer functioning as: a power-supply control unit that: sets the power supply to an on state when a predetermined power-on condition is satisfied; and sets the power supply to an off state when a first power-off condition or a second power-off condition is satisfied while the vehicle is stopped and the power supply is in the on state, the first power-off condition being a condition in which a predetermined power-off operation is performed by a user of the vehicle, the second power-off condition being a condition in which a first predetermined time elapses from a time when the user gets off the vehicle; and a power-on-condition setting unit that: sets the power-on condition to a first power-on condition, when the power-supply control unit sets the power supply to the off state because the first power-off condition is satisfied; and sets the power-on condition to a second power-on condition, when the power-supply control unit sets the power supply to the off state because the second power-off condition is satisfied, the second power-on condition being different from the first power-on condition.

According to the vehicle control device described above, the power-on-condition setting unit sets the power-on condition to the first power-on condition when the power supply is set to the off state by the first power-off condition in response to the power-off operation of the user, and the power-on-condition setting unit sets the power-on condition to the second power-on condition different from the first power-on condition when the power supply is set to the off state by the second power-off condition in response to elapse of the first predetermined time.

The second power-on condition is thus set different from the first power-on condition to enable making the load on the user for satisfying the second power-on condition lighter than the load on the user for satisfying the first power-on condition. Therefore, when the power supply is set to the off state by the control on the vehicle side because the second power off condition is satisfied, the next operation of power-on by the user can be facilitated.

DETAILED DESCRIPTION OF THE PREFERRED EMBODIMENTS

1. Vehicle Configuration

Figure 1:
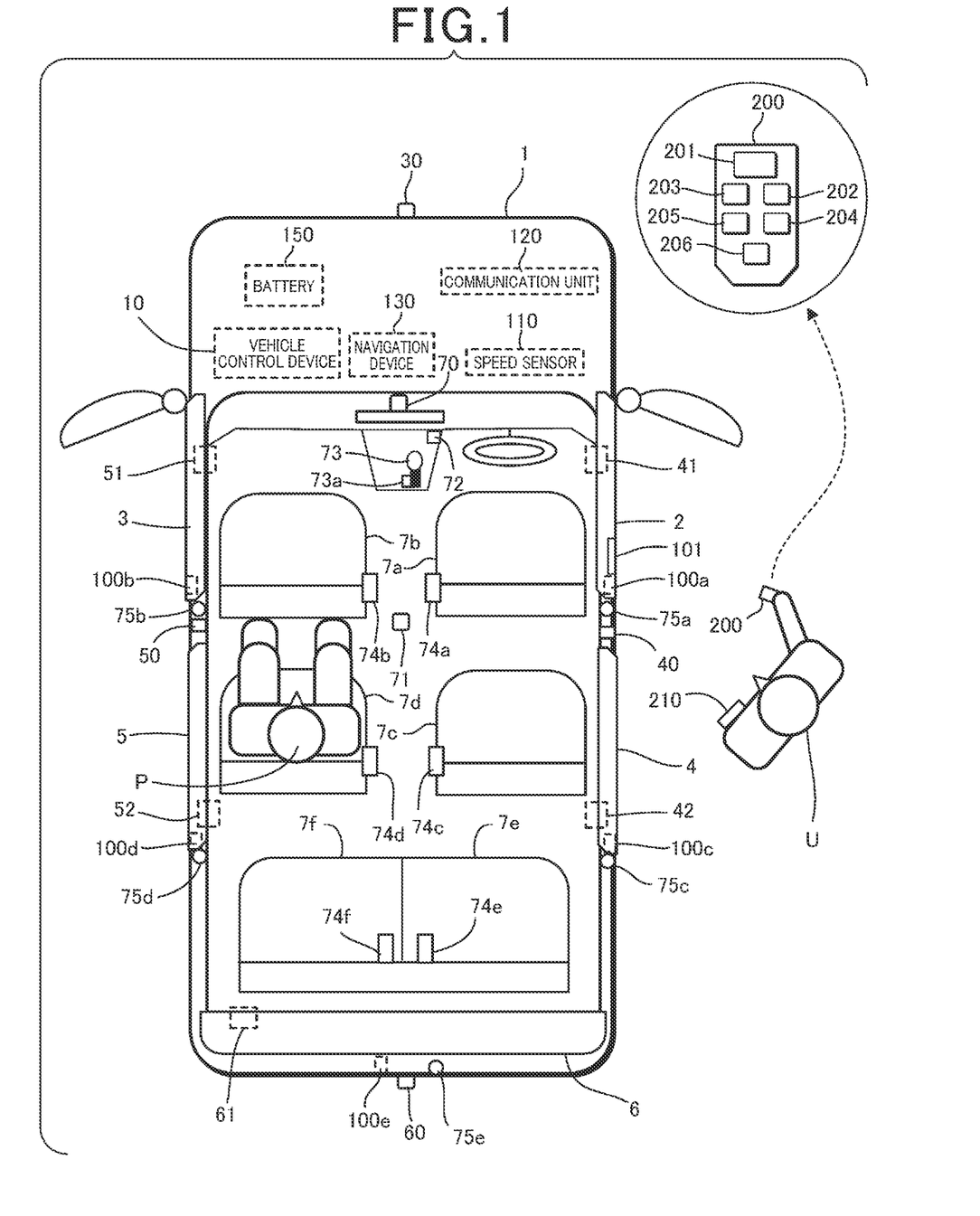
FIG. 1 is a configuration diagram of a vehicle equipped with a vehicle control device.

A configuration of a vehicle 1 equipped with a vehicle control device 10 of this embodiment is described below with reference to FIG. 1. As shown in FIG. 1, the vehicle 1 is a passenger car having a seating capacity of 6 people, and includes a driver's seat 7a, a front passenger seat 7b, a second row right seat 7c, a second row left seat 7d, a third row right seat 7e, and a third row left seat 7f. The respective seats 7a to 7f are provided with seatbelt switches 74a to 74f (not shown) for detecting whether respective seatbelts are fastened.

The vehicle 1 includes a right power hinge door 2, a left power hinge door 3, a right power slide door 4, a left power slide door 5, and a power tailgate 6. The door knob of the right power hinge door 2 is provided with a door touch sensor 101, and a user U who carries a portable key 200 of the vehicle 1 can unlock the doors 2 to 6 of the vehicle 1 by touching the door touch sensor 101.

The right power hinge door 2 includes a right PHD (Power Hing Door) drive unit 41 that drives the right power hinge door 2 by an electric actuator (not shown) for opening and closing, and the left power hinge door 3 includes a left PHD drive unit 51 that drives the left power hinge door 3 by an electric actuator for opening and closing. The right power slide door 4 includes a right PSD (Power Slide Door) drive unit 42 that drives the right power slide door 4 by an electric actuator for opening and closing, and the left power slide door 5 includes a left PSD drive unit 52 that drives the left power slide door 5 by an electric actuator for opening and closing. The power tailgate 6 includes a PTG (Power Tail Gate) drive unit 61 that drives the power tailgate 6 by an electric actuator for opening and closing.

A front camera 30 for photographing the front of the vehicle 1 is provided at a front part of the vehicle 1, and a rear camera 60 for photographing the rear of the vehicle 1 is provided at a rear part of the vehicle 1. A right side camera 40 for photographing the right side of the vehicle 1 is provided on a right side part of the vehicle 1, and a left side camera 50 for photographing the left side of the vehicle 1 is provided on a left side part of the vehicle 1. In addition, a dashboard of the vehicle interior is provided with a front-seat camera 70 for photographing passengers sitting on the driver's seat 7a and the front passenger seat 7b. On the ceiling of the vehicle interior, there is provided a rear-seat camera 71 for photographing passengers who sit on the second row right seat 7c, the second row left seat 7d, the third row right seat 7e, and the third row left seat 7f.

The respective doors 2 to 5 are provided with door switches 75a to 75d for detecting the opening and closing of the doors. The power tailgate 6 is also provided with a door switch 75e for detecting the opening and closing of the power tailgate 6. Furthermore, a power switch 72 for instructing on and off of a battery 150 and a shift switch 73a for detecting a shift position of a shift lever 73 are provided near the driver's seat 7a. When the battery 150 is on, electric power is supplied from the battery 150 to electrical components (not shown), and when the battery 150 is off, supply of electric power from the battery 150 to the electrical components is shut off.

Furthermore, the vehicle 1 includes; the battery 150 (corresponding to a power supply of the present invention) that supplies electric power to a load 151 provided in the vehicle 1; door lock mechanisms 100*a* to 100*e* that lock respective doors 2 to 5 and the power tailgate 6, a speed sensor 110 that detects a traveling speed of the vehicle 1; a communication unit 120 that communicates with a portable key 200, a user terminal 210, and the like; and a navigation device 130. The load 151 includes an air conditioner (not shown) and an electric motor, provided in the vehicle 1. The navigation device 130 has a GPS (Global Positioning System) sensor and map data (not shown), and executes route guidance to a destination based on the position of the vehicle 1 detected by the GPS sensor and the map data.

2. Vehicle Control Device Configuration

A configuration of the vehicle control device 10 is described below with reference to FIG. 2. The vehicle control device 10 includes an ECU (Electronic Control Unit) that is configured with a CPU (Central Processing Unit, which corresponds to a computer of the present invention and is not shown), a memory 80, an interface circuit (not shown), and the like, to control the operation of the vehicle 1.

The vehicle control device 10 receives input of images of the surroundings of the vehicle 1 taken by the front camera 30, the right side camera 40, the left side camera 50, and the rear camera 60. In addition, the vehicle control device 10 receives input of images of the vehicle interior taken by the front-seat camera 70 and the rear-seat camera 71.

Furthermore, the vehicle control device 10 receives input of: detection signals of the power switch 72, the shift switch 73*a*, the seatbelt switches 74*a* to 74*f*, and the door switches 75*a* to 75*e*; and lock detection signals for the respective doors 2 to 5 and the power tailgate 6 by door lock sensors (not shown) provided in the door lock mechanisms 100*a* to 100*e*.

In addition, the vehicle control device 10 receives input of: a touch detection signal by the door touch sensor 101, a speed detection signal of the speed sensor 110, and information on the current position of the vehicle 1 detected by the navigation device 130.

Control signals output from the vehicle control device 10 control the operation of: the right PHD drive unit 41; the right PSD drive unit 42; the left PHD drive unit 51; the left PSD drive unit 52; the PTG drive unit 61; the door lock mechanisms 100*a*-100*e*; and the battery 150. In addition, the vehicle control device 10 communicates with the portable key 200 carried by the user U and the user terminal 210 via the communication unit 120.

The CPU reads and executes a control program 81 (vehicle control program) of the vehicle control device 10 stored in the memory 80 to function as: a key authentication unit 11; a user-getting-on recognizing unit 12; a passenger recognizing unit 13; a door-lock control unit 14; a door-lock-unlocking recognizing unit 15; a parking-point recognizing unit 16; a user recognizing unit 17; power-supply control unit 18; and a power-on-condition setting unit 19. The memory 80 stores an authentication ID code 82 used when the user U is authenticated by the portable key 200. The CPU corresponds to a computer. The memory 80 corresponds to a recording medium. The control program 81 may be recorded on an external recording medium (flash memory, magnetic disk, optical disk, etc.) that can be read and written by a computer, to be transferred from the external recording medium to the memory 80. The memory 80 and the external recording medium are tangible recording media that are not transient.

A process executed by the power-supply control unit 18 corresponds to a power-supply control step in a vehicle control method of the present invention, and a process executed by the power-on-condition setting unit 19 corresponds to a power-on condition setting step in the vehicle control method of the present invention.

As shown in FIG. 1, when the user U who carries the portable key 200 approaches the vehicle 1, the key authentication unit 11 communicates with the portable key 200 via the communication unit 120, and receives an ID code from the portable key 200. Then, when the received ID code equals the authentication ID code 82 stored in the memory 80, the key authentication unit 11 permits the user U to use the vehicle 1. As a result, the user U can operate the vehicle 1 with the portable key 200.

As shown in FIG. 1, the portable key 200 includes: a lock-unlock button 201 for instructing lock and unlock of the vehicle 1; a right power hinge door button 202 for instructing opening and closing of the right power hinge door 2; a left power hinge door button 203 for instructing opening and closing of the left power hinge door 3; a right power slide door button 204 for instructing opening and closing of the right power slide door 4; a left power slide door button 205 for instructing opening and closing of the left power slide door 5; and a power tail gate button 206 for instructing the opening and closing of the power tailgate 6. Hereinafter, the right power hinge door 2, the left power hinge door 3, the right power slide door 4, the left power slide door 5, and the power tailgate 6 are also collectively referred to as electric doors.

The user U can operate the lock-unlock button 201 of the portable key 200 to unlock the respective doors 2 to 6 of the vehicle 1 to get on the vehicle 1. In addition, the user U can instruct the vehicle 1 to open and close the electric doors by operating the buttons 202 to 206 of the portable key 200. The user U who carries the portable key 200 and gets on the vehicle 1 turns on the power switch 72 to start the vehicle 1 and starts using the vehicle 1.

When the portable key 200 is measured to be in the interior of the vehicle 1 by the communication status between the communication unit 120 and the portable key 200, the user-getting-on recognizing unit 12 recognizes that the user U is in the vehicle 1. Note that, when the face image of the user U can be identified from the image taken by the front-seat camera 70 or the rear-seat camera 71, the user-getting-on recognizing unit 12 may recognize that the user U is in the vehicle 1.

The passenger recognizing unit 13 recognizes that there is a passenger in the vehicle 1 when an image of a person is identified from the image taken by the front-seat camera 70 or the rear-seat camera 71. The door lock control unit 14 releases the door lock mechanisms 100*a* to 100*e* when the lock-unlock button 201 of the portable key 200 is operated or when a touch to the door touch sensor 101 is detected, while the portable key 200 is authenticated by the key authentication unit 11. The door-lock-unlocking recognizing unit 15 recognizes the release of the door lock mechanisms 100*a* to 100*e* by the detection signal of the door lock sensors provided in the door lock mechanisms 100*a* to 100*e*. Note that the door-lock-unlocking recognizing unit 15 may recognize the release of the door lock mechanisms 100*a* to 100*e* when the lock-unlock button 201 of the portable key 200 or the door touch sensor 101 is operated.

The parking-point recognizing unit 16 recognizes the point where the vehicle 1 is parked based on the current position information of the vehicle 1 detected by the navigation device 130 and map information stored in the navigation device 130. The user recognizing unit 17 recognizes that the portable key 200 or the user terminal 210 exists within a predetermined range around the vehicle 1. In this case, the portable key 200 and the user terminal 210 correspond to a user terminal of the present invention. Here, the predetermined range is set to a range in which short-range wireless communication by NFC (Near field communication) or the like is possible between the communication unit 120 or the portable key 200, for example. Note that, if the distance between the vehicle 1 and the portable key 200 or the user terminal can be measured, a range within a predetermined distance from the vehicle 1 may be set as the predetermined range. In addition, the user recognizing unit 17 recognizes the user U located within the predetermined range from the images taken by the cameras outside the vehicle (front camera 30, right side camera 40, left side camera 50, rear camera 60).

The power-supply control unit 18 controls turning on and off of the battery 150. When the battery 150 is in the on state, electric power is supplied from the battery 150 to the load 151, and when the battery 150 is in the off state, supply of electric power from the battery 150 to the load 151 is shut off. The power-on-condition setting unit 19 sets a power-on condition, which is a condition for the power-supply control unit 18 to set the battery 150 on.

3. Power-Off Control

The power-off control executed by the power-supply control unit 18 and the power-on-condition setting unit 19 is described below with reference to the flowcharts shown in FIGS. 3 and 4. The power-supply control unit 18 and the power-on-condition setting unit 19 execute power-off control according to the flowcharts shown in FIGS. 3 and 4 when the user-getting-on recognizing unit 12 recognizes that the user U is in the vehicle 1 and the battery 150 is in the on state.

Figure 3:
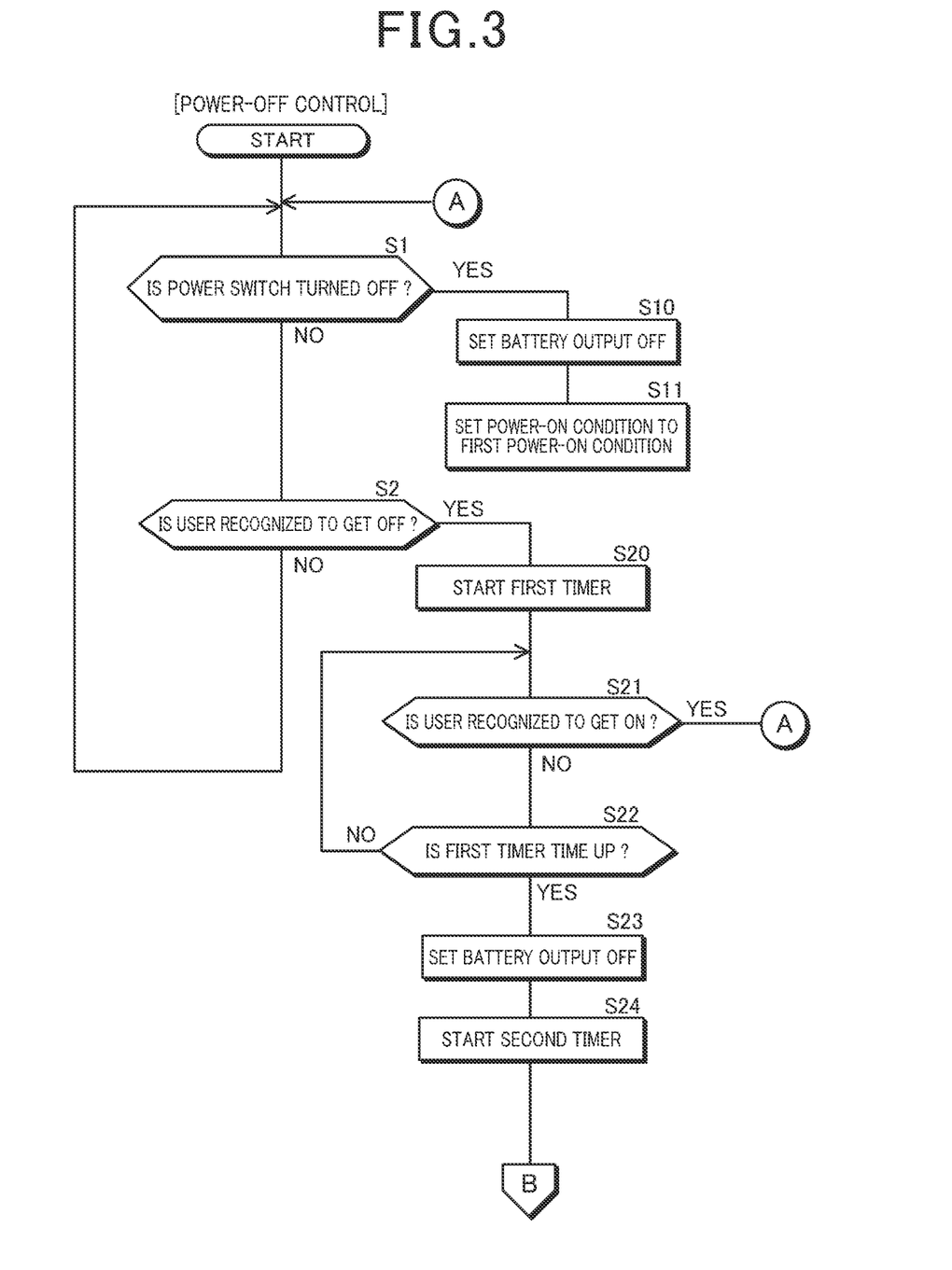
FIG. 3 is a first flowchart of power-off control.

The power-supply control unit 18 executes a loop including steps S1 and S2 of FIG. 3, determines whether the power switch 72 is turned off in step S1, and determines whether the user U is recognized to have got off the vehicle 1 in step S2. The power-supply control unit 18 advances the process from step S1 to step S10 when the power switch 72 is turned off.

In step S10, the power-supply control unit 18 set the battery 150 to the off state, and shuts off the power supply from the battery 150 to the load 151. In following step S11, the power-on-condition setting unit 19 sets the power-on condition to a first power-on condition. Here, the following conditions are set as the first power-on condition. In this case, the number of determination conditions for the first power-on condition is three.

The first power-on condition is: (1) the portable key 200 is recognized to be in the interior of the vehicle 1; (2) the brake pedal (not shown) is depressed; and (3) the power switch 72 is turned on.

Under the first power-on condition, the user U must operate the power switch 72, and therefore needs to perform an unlocking operation of the vehicle 1 and get on the vehicle 1.

Note that the vehicle 1 is an AT (Automatic Transmission) vehicle, but the first power-on condition for an MT (Manual Transmission) vehicle is: (1) the portable key 200 is recognized to be in the vehicle interior; (2) the clutch pedal (not shown) is depressed; and (3) the power switch 72 is turned on.

In step S2, when the power-supply control unit 18 recognizes that the user U gets off the vehicle 1, it advances the process to step S20. Here, the power-supply control unit 18 recognizes that the user U has got off the vehicle 1 when all of the following first to fourth conditions are satisfied.

First condition: The vehicle 1 is stopped (the vehicle speed is 0 km/hour). The vehicle speed is detected by the speed sensor 110.

Second condition: The shift position of the shift lever 73 is parking. The shift position of the shift lever 73 is detected by the shift switch 73a. Note that, in the case of an MT vehicle, the shift position is always processed as parking.

Third condition: The seat belt of the driver's seat 7a is not fastened. The fact that the seatbelt of the driver's seat 7a is not fastened is detected by the seatbelt switch 74a.

Fourth condition: The right power hinge door 2 is switched from a closed state to an open state. The fact that the right power hinge door 2 is changed from the closed state to the open state is detected by the door switch 75a.

In step S20, the power-supply control unit 18 starts a first timer. The set time of the first timer is set to, for example, about 20 minutes. The set time of the first timer corresponds to a first predetermined time of the present invention. With the loop processing of following step S21 and step S22, the power-supply control unit 18 determines whether the user U returns to the vehicle 1 and gets on the vehicle 1 in step S21 until the first timer time is up in step S22.

The power-supply control unit 18 recognizes that the user U gets on the vehicle 1 when the key authentication unit 11 authenticates the portable key 200, the vehicle 1 is unlocked by an operation of the lock-unlock button 201 of the portable key 200 or the door touch sensor 101, and the door switch 75a detects that the right power hinge door 2 is switched from the closed state to the open state, and then to the closed state.

When the power-supply control unit 18 recognizes that the user U gets on the vehicle 1 in step S21, it advances the process to step S1. In addition, when the first timer time is up in step S22, the power-supply control unit 18 advances the process to step S23. In step S23, the power-supply control unit 18 turns off the output of the battery 150. As a result, the electric power from the battery 150 to the load 151 is shut off, and when the vehicle 1 is a gasoline vehicle and the engine is in operation, the engine is stopped. When the air conditioner is in operation, the air conditioner also stops an operation.

In next step S24, the power-supply control unit 18 starts a second timer. The set time of the second timer is set to, for example, about 10 minutes. The set time of the second timer corresponds to a second predetermined time of the present invention. Subsequent steps S25 to S28 and step S30 of FIG. 4 are processes performed by the power-on-condition setting unit 19.

In step S25, the power-on-condition setting unit 19 determines whether the vehicle 1 is parked at a place other than a home of the user U based on a recognition result by the parking-point recognizing unit 16. Then, when the vehicle 1 is parked at a place other than the home of the user U, the power-on-condition setting unit 19 advances the process to step S26, and when the vehicle 1 is parked at the home of the user U, it advances the process to step S30.

In step S26, the power-on-condition setting unit 19 transmits power-on-condition-setting-information that inquires whether a second power-on condition can be set, to the user terminal 210. Here, the following conditions are set as the second power-on condition.

Second power-on condition: The user U performs an unlocking operation of the vehicle 1.

The number of determination condition for the second power-on condition is one, which is less than the number of determination conditions for the first power-on condition described above, which is three.

When the user U performs the unlocking operation of the vehicle 1, the portable key 200 needs to be authenticated by the key authentication unit 11, so that the user U must carry the portable key 200.

In following step S27, the power-on-condition setting unit 19 determines whether to receive setting-acceptance-information for accepting the setting of the second power-on condition, which is transmitted from the user terminal 210. Then, when the power-on-condition setting unit 19 receives the setting-acceptance-information, it advances the process to step S27, and sets the power-on condition to the second power-on condition. On the other hand, when the power-on-condition setting unit 19 does not receive the setting-acceptance-information, it advances the process to step S30. In step S30, the power-on-condition setting unit 19 sets the power-on condition to the first power-on condition.

When the second power-on condition is set in step S28, the user U can turn on the output of the battery 150 to operate the air conditioner or the like by performing the unlocking operation of the vehicle 1. In this case, the user U does not need to get on the vehicle 1 and turn on the power switch 72 as in the first power-on condition, so that the operation of returning the battery to the on state can be easier when the battery 150 is set off in step S23.

4. Power-On Control

The power-on control executed by the power-supply control unit 18 is described below with reference to the flowchart shown in FIG. 5. The power-supply control unit 18 executes power-on control according to the flowchart shown in FIG. 5 when the vehicle 1 is stopped and the battery 150 is in the off state. In step S50 of FIG. 5, the power-supply control unit 18 determines whether the power-on condition is set to the first power-on condition.

Then, the power-supply control unit 18 advances the process to step S60 when the power-on condition is set to the first power-on condition, and it advances the process to step S51 when the power-on condition is not set to the first power-on condition (when the power-on condition is set to the second power-on condition). In step S60, the power-supply control unit 18 determines whether the power switch 72 is operated by the user U according to the first power-on condition. Then, when the power switch 72 is operated by the user U, the power-supply control unit 18 advances the process to step S61 to set the output of the battery 150 on.

In step S51, the power-supply control unit 18 determines whether the door-lock-unlocking recognizing unit 15 recognizes the release of the door lock mechanisms 100a to 100e according to the second power-on condition. Then, when the release of the door lock mechanisms 100a to 100e is recognized, the power-supply control unit 18 advances the process to step S70 to set the output of the battery 150 on. On the other hand, when the release of the door lock mechanisms 100a to 100e is not recognized, the power-supply control unit 18 advances the process to step S52.

In step S52, the power-supply control unit 18 determines whether time is up for the second timer, which starts timing when the battery 150 is set off in step S24 of FIG. 3. Then, the power-supply control unit 18 advances the process to step S50 when the time is up for the second timer, and advances the process to step S80 when the time is not up for the second timer.

In step S80, the power-supply control unit 18 determines whether the passenger of the vehicle 1 operates the power switch 72. Then, when the passenger operates the power switch 72, the power-supply control unit 18 advances the process to step S81 to set the output of the battery 150 on. Here, the passenger is not limited to the user U. In other words, in the determination of step S80, the authentication of the portable key 200 by the key authentication unit 11 is not a requirement.

Therefore, as shown in FIG. 1, when the user U carries the portable key 200 and gets off the vehicle 1 in a situation in which a passenger P other than the user U is in the vehicle 1, the passenger P can turn on the power switch 72 to return the battery 150 to the on state. In other words, when the output of the battery 150 is set off in step S23 of FIG. 3, until the set time of the second timer elapses from the time when the output of the battery 150 is set off, the passenger P can turn on the power switch 72 to return the battery 150 to the on state.

Here, the turning on the power switch 72 in step S60 corresponds to a first power-on operation of the present invention, and the turning on the power switch 72 in step S80 corresponds to a second power-on operation of the present invention. In the present embodiment, the first power-on operation and the second power-on operation are both operated by the power switch 72, but the first power-on operation and the second power-on operation may be different. For example, the second power-on operation may be an operation of a switch of an air conditioner or a switch of an audio device provided in the vehicle 1.

In addition, after the time of the second timer is up, both the first power-on condition and the second power-on condition may be set as the power-on condition. This allows the user coming from outside the vehicle to turn on the battery 150 at a timing of unlocking the door according to the first power-on condition, and allows the user in the vehicle to turn on the battery 150 according to the first power-on condition, which can ensure both safety and convenience.

5. Other Embodiments

In the above embodiment, the power-on-condition setting unit 19 has set the second power-on condition such that the door lock mechanism 100a of the vehicle 1 is unlocked, but the second power-on condition may be set to another condition different from the first power-on condition. For example, a second power-on condition may be set such that the user recognizing unit 17 recognizes that: the portable key 200 exists within a predetermined range around the vehicle 1; the user terminal 210 exists within a predetermined range around the vehicle 1; or the user U exists within a predetermined range around the vehicle 1. Alternatively, a second power-on condition may be set such that the face of the user U is authenticated from the image taken by the right side camera 40.

The number of determination condition is one when the second power-on condition is thus set, and it is less than three, which is the number of determination conditions for the first power-on condition. This can reduce the load for the power supply restoration operation by the user.

In addition, whereas the first power-on condition of the above embodiment includes the operation of the brake pedal and the power switch performed by the user in the vehicle interior, the second power-on condition is only the door unlocking operation performed by the user outside the vehicle. Therefore, the user can set the power of the vehicle on to start the electrical components of the vehicle before getting on the vehicle, and this can reduce the power supply restoration operation by the user.

Still alternatively, the first power-on condition may be set as an operation that can only be performed after the user approaches the vehicle and opens the vehicle door, and the second power-on condition may be set as an operation that can be performed before the user opens the door of the vehicle.

Figure 4:
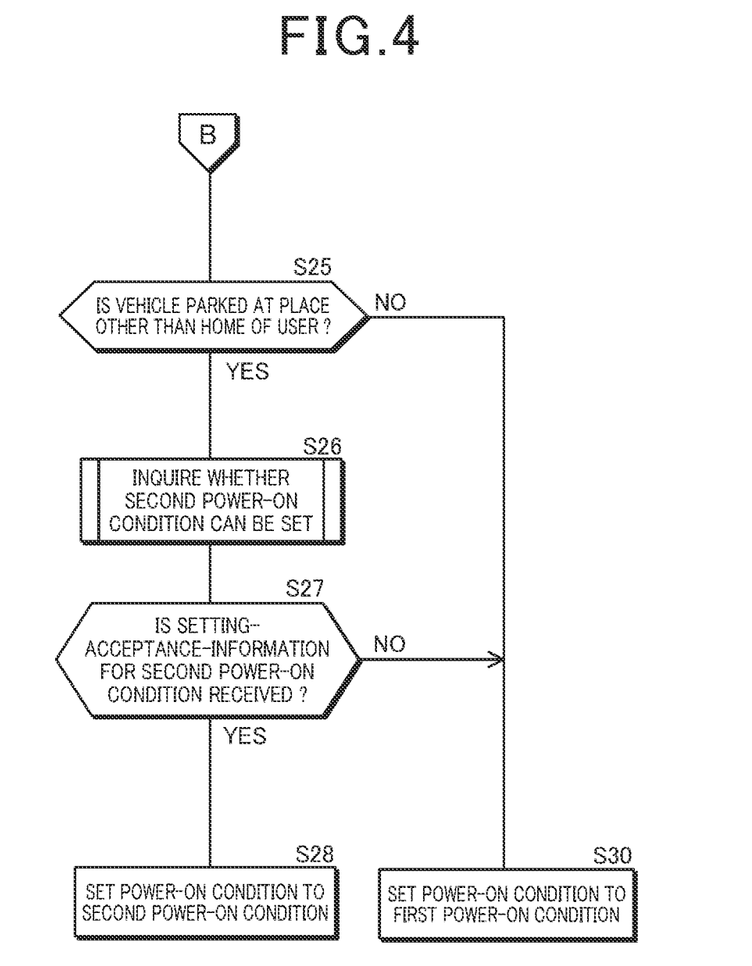
FIG. 4 is a second flowchart of power-off control.

In the above embodiment, the power-on-condition setting unit 19 sets the power-on condition to the second power-on condition in step S28 on condition that vehicle 1 is parked at a place other than the home of user U in step S25 of FIG. 4. Another embodiment may be configured such that the determination is not performed on whether the vehicle 1 is parked at a place other than the home of the user U.

In the above embodiment, the power-on-condition setting unit 19 performs a process of inquiring of the user U whether the power-on condition can be set to the second power-on condition in steps S26 to S27 of FIG. 4, but this process may be omitted.

Figure 5:
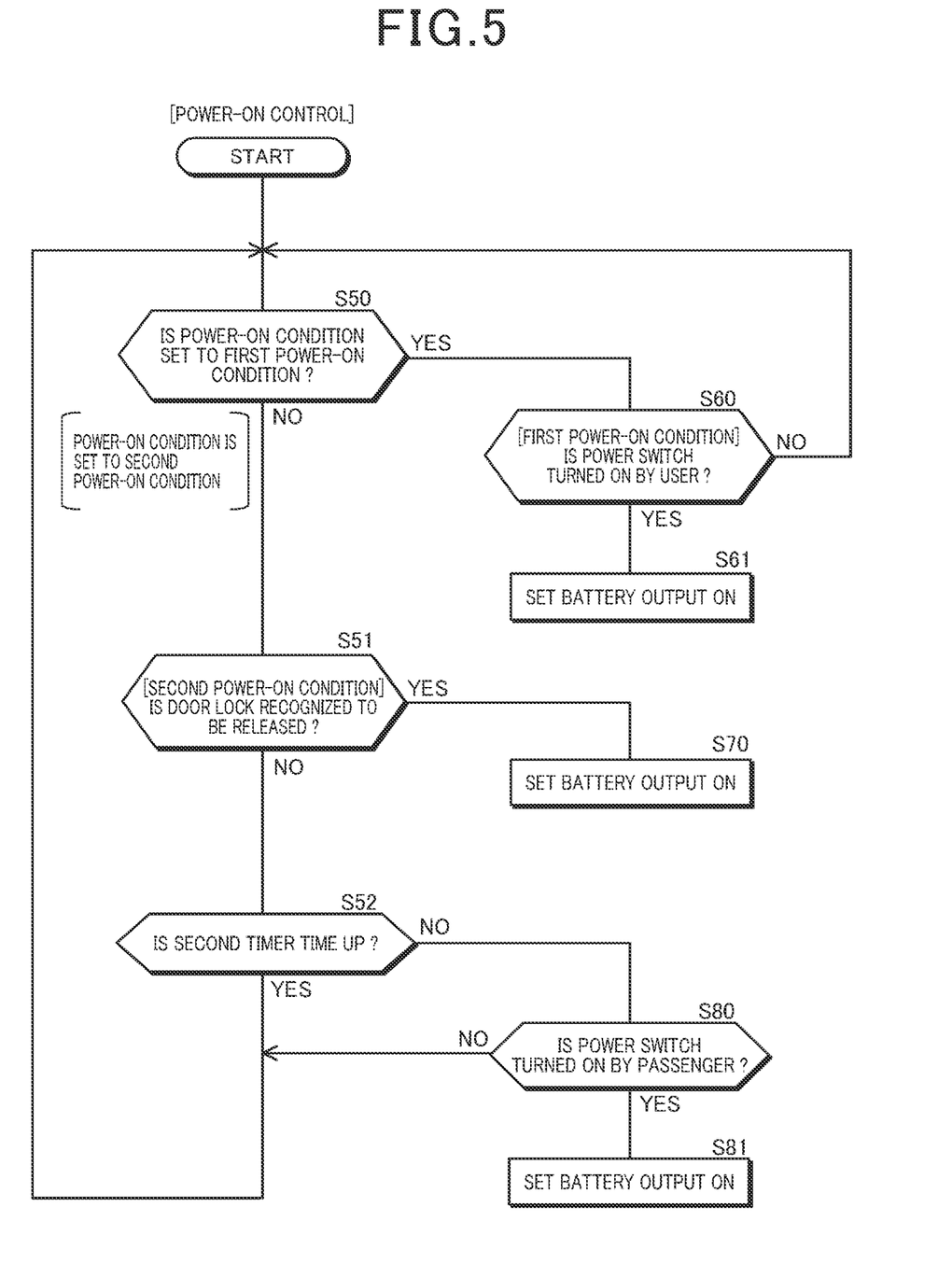
FIG. 5 is a flowchart of power-on control.

In the above embodiment, the process of step S52 and steps S80 to S81 of FIG. 5 allows the passenger P other than the user U to turn on the power switch 72, but this process may be omitted.

Figure 2:
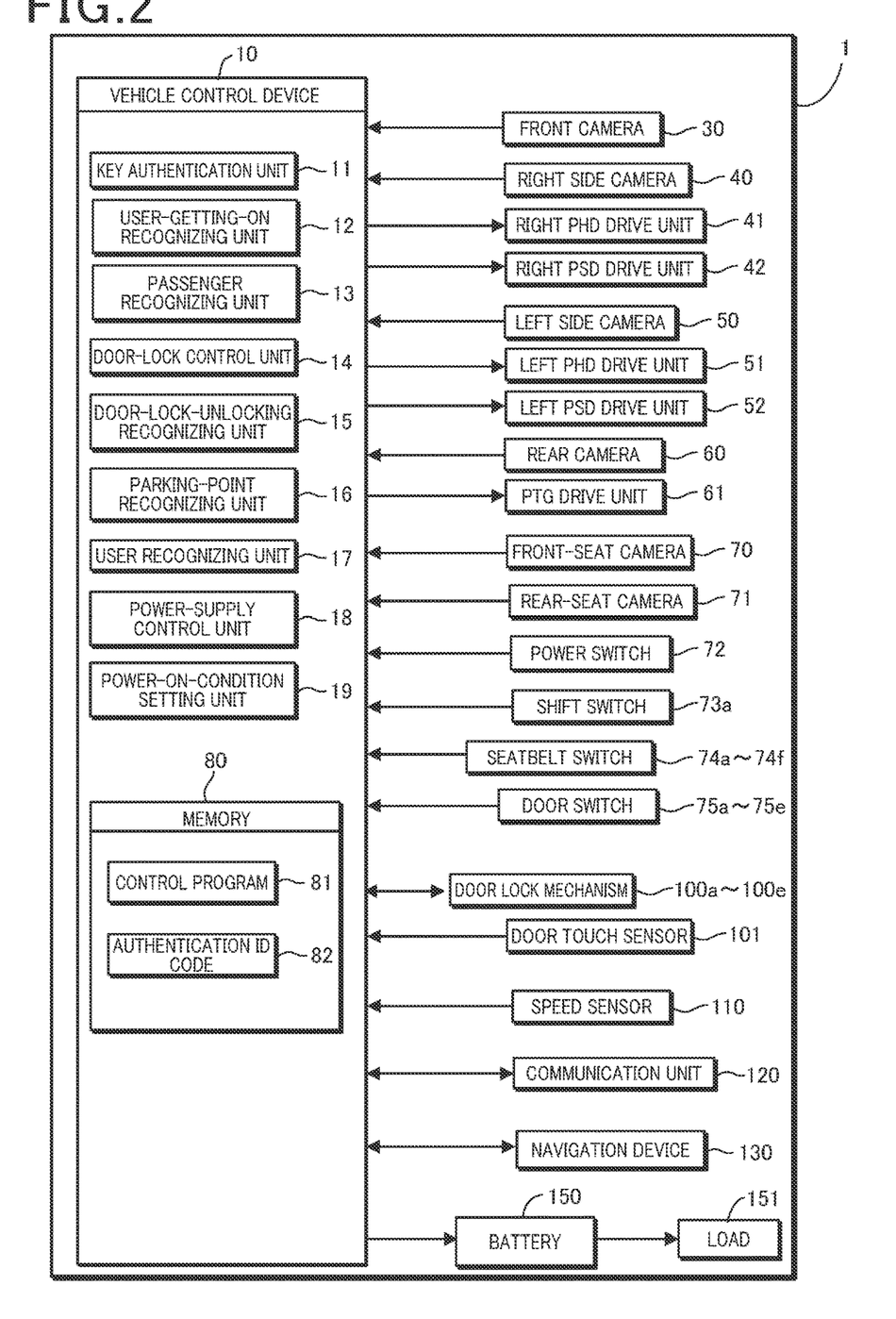
FIG. 2 is a configuration diagram of the vehicle control device.

Note that, FIGS. 1 and 2 are schematic diagrams showing the configurations of the vehicle 1 and the vehicle control device 10 classified according to what is mainly in the process in order to facilitate understanding of the invention of the application, and the configurations of the vehicle 1 and the vehicle control device 10 may be configured by other classification. In addition, the process of each component may be executed by one hardware unit, or may be executed by a plurality of hardware units. In addition, the processing by each component shown in FIGS. 3 to 5 may be executed by one program or may be executed by a plurality of programs.

6. Configurations Supported by the Above Embodiments

The above embodiments are specific examples of the following configurations.

Item 1

A vehicle control device that controls on and off of a power supply provided in a vehicle, the vehicle control device including: a power-supply control unit that: sets the power supply to an on state when a predetermined power-on condition is satisfied; and sets the power supply to an off state when a first power-off condition or a second power-off condition is satisfied while the vehicle is stopped and the power supply is in the on state, the first power-off condition being a condition in which a predetermined power-off operation is performed by a user of the vehicle, the second power-off condition being a condition in which a first predetermined time elapses from a time when the user gets off the vehicle; and a power-on-condition setting unit that: sets the power-on condition to a first power-on condition, when the power-supply control unit sets the power supply to the off state because the first power-off condition is satisfied; and sets the power-on condition to a second power-on condition, when the power-supply control unit sets the power supply to the off state because the second power-off condition is satisfied, the second power-on condition being different from the first power-on condition.

According to the vehicle control device described above, the power-on-condition setting unit sets the power-on condition to the first power-on condition when the power supply is set to the off state by the first power-off condition in response to the power-off operation of the user, and the power-on-condition setting unit sets the power-on condition to the second power-on condition different from the first power-on condition when the power supply is set to the off state by the second power-off condition in response to elapse of the first predetermined time. The second power-on condition is thus set different from the first power-on condition to enable making the load on the user for satisfying the second power-on condition lighter than the load on the user for satisfying the first power-on condition. Therefore, when the power supply is set to the off state by the control on the vehicle side because the second power off condition is satisfied, the next operation of power-on by the user can be facilitated.

Item 2

The vehicle control device according to item 1, wherein the second power-on condition is different from the first power-on condition because a number of determination conditions for the second power-on condition is smaller than a number of determination conditions for the first power-on condition.

According to the vehicle control device described in item 2, the number of determination conditions for the second power-on condition is made smaller than the number of determination conditions for the first power-on condition to differentiate the second power-on condition from the first power-on condition, so that the next operation of power-on by the user can be facilitated when the power supply is set to the off state by the control on the vehicle side.

Item 3

The vehicle control device according to item 1 or 2, including a door-lock-unlocking recognizing unit that recognizes unlocking of a door lock mechanism provided in the vehicle, wherein the power-on-condition setting unit sets the second power-on condition to that the door-lock-unlocking recognizing unit recognizes unlocking of the door lock mechanism.

According to the vehicle control device of item 3, the user can return the power supply to the on state by performing the unlocking operation of the door lock.

Item 4

The vehicle control device according to item 3, including a parking-point recognizing unit that recognizes a parking point where the vehicle is stopped, wherein the power-on-condition setting unit sets the second power-on condition to: that the parking-point recognizing unit recognizes that the parking point is at a place other than a home of the user; and that the door-lock-unlocking recognizing unit recognizes unlocking of the door lock mechanism.

According to the vehicle control device of item 4, when the vehicle is stopped at a parking point other than the home and the user is presumed to intentionally get off with the power supply of the vehicle in the on state, the user can return the power supply to the on state by performing the unlocking operation of the door lock.

Item 5

The vehicle control device according to any one of items 1 to 4, wherein: the power-on-condition setting unit transmits power-on-condition-setting-information to a user terminal when the power-supply control unit sets the power supply to the off state because the second power-off condition is satisfied; and the power-on-condition setting unit sets the power-on condition to the second power-on condition when setting-acceptance-information is received from the user terminal, the user terminal being used by the user, the power-on condition setting information inquiring whether to set the power-on condition to the second power-on condition, the setting-acceptance-information allowing setting of the second power-on condition.

According to the vehicle control device of item 5, the power-on condition can be set to the second power-on condition only when the user desires.

Item 6

The vehicle control device according to any one of items 1 to 5, including a user recognizing unit that recognizes that the user or a user terminal used by the user exists within a predetermined range around the vehicle, wherein the power-on-condition setting unit sets the second power-on condition to that the user recognizing unit recognizes that the user or the user terminal exists within the predetermined range.

According to the vehicle control device of item 6, the user can return the power supply to the on state by approaching the vehicle or by carrying the user terminal and approaching the vehicle.

Item 7

The vehicle control device according to any one of items 1 to 6, including a user-getting-on recognizing unit that recognizes that the user is in the vehicle, wherein: the power-on-condition setting unit sets the first power-on condition to that a first power-on operation is performed in a state in which the user-getting-on recognizing unit recognizes that the user is in the vehicle; and when the power supply is set to the off state by the power-supply control unit because the second power-off condition is satisfied, and subsequently a second power-on operation is performed during a period from a time point when the power supply is set to the off state until a second predetermined time elapses, the power-supply control unit sets the power supply to the on state regardless of whether or not the user-getting-on recognizing unit recognizes that the user is in the vehicle.

According to the vehicle control device of item 7, when the user gets off the vehicle and the power supply is set off while a passenger other than the user remains in the vehicle, the passenger can perform the second power-on operation to return the power supply to the on state.

Item 8

The vehicle control device according to item 7, including a passenger recognizing unit that recognizes whether a passenger is in the vehicle, wherein, when the power supply is set to the off state by the power-supply control unit because the second power-off condition is satisfied, and subsequently the passenger recognizing unit recognizes that a passenger is in the vehicle and a second power-on operation is performed during a period from a time point when the power supply is set to the off state until the second predetermined time elapses, the power-supply control unit sets the power supply to the on state regardless of whether or not the user-getting-on recognizing unit recognizes that the user is in the vehicle.

According to the vehicle control device of item 8, the power supply can be returned to the on state by the second power-on operation on condition that the passenger recognizing unit recognizes that there is a passenger in the vehicle Item 9

A vehicle control method that is executed by a computer to control on and off of a power supply provided in a vehicle, the method including a power-supply control step that sets: the power supply to an on state when a predetermined power-on condition is satisfied; and the power supply to an off state when a first power-off condition or a second power-off condition is satisfied while the vehicle is stopped and the power supply is in the on state, the first power-off condition being a condition in which a predetermined power-off operation is performed by a user of the vehicle, the second power-off condition being a condition in which a first predetermined time elapses from a time when the user gets off the vehicle; and a power-on-condition setting step that: sets the power-on condition to a first power-on condition, when the power-supply control step sets the power supply to the off state because the first power-off condition is satisfied; and sets the power-on condition to a second power-on condition, when the power-supply control step sets the power supply to the off state because the second power-off condition is satisfied, the second power-on condition having a smaller operation load on the user than the first power-on condition.

Executing the vehicle control method of item 9 by the computer enables obtaining the same function effect as the control device of item 1.

Item 10

A non-transient recording medium on which a vehicle control program is recorded, the vehicle control program causing a computer to function to control on and off of a power supply provided in a vehicle, the computer functioning as: a power-supply control unit that: sets the power supply to an on state when a predetermined power-on condition is satisfied; and sets the power supply to an off state when a first power-off condition or a second power-off condition is satisfied while the vehicle is stopped and the power supply is in the on state, the first power-off condition being a condition in which a predetermined power-off operation is performed by a user of the vehicle, the second power-off condition being a condition in which a first predetermined time elapses from a time when the user gets off the vehicle; and a power-on-condition setting unit that: sets the power-on condition to a first power-on condition, when the power-supply control unit sets the power supply to the off state because the first power-off condition is satisfied; and sets the power-on condition to a second power-on condition, when the power-supply control unit sets the power supply to the off state because the second power-off condition is satisfied, the second power-on condition having a smaller operation load on the user than the first power-on condition.

Executing the vehicle control program of the item 10 by the computer enables realizing the configuration of the vehicle control device of item 1.

REFERENCE SIGNS LIST 1 vehicle
2 right power hinge door
3 left power hinge door
4 right power slide door
5 left power slide door
6 power tailgate
10 vehicle control device
11 key authentication unit
12 user-getting-on recognizing unit
13 passenger recognizing unit
14 door-lock control unit
15 door-lock-unlocking recognizing unit
16 parking-point recognizing unit 17 user recognizing unit
18 power-supply control unit
19 power-on-condition setting unit
80 memory
81 control program
72 power switch
73a shift switch
74a-74e seatbelt switch
75a-75e door switch
100a-100e door lock mechanism
101 door touch sensor
110 speed sensor
120 communication unit
130 navigation device
150 battery

What is claimed is:

1. A vehicle control device that controls on and off of a power supply provided in a vehicle, the vehicle control device comprising a central processing unit (CPU) wherein the CPU includes:
a power-supply control unit that: sets the power supply to an on state when a predetermined power-on condition is satisfied; and sets the power supply to an off state when a first power-off condition or a second power-off condition is satisfied while the vehicle is stopped and the power supply is in the on state, the first power-off condition being a condition in which a predetermined power-off operation is performed by a user of the vehicle while the power supply is in the on state, the second power-off condition being a condition in which a first predetermined time elapses from a time when the user gets out of the vehicle while the power supply is in the on state;
a power-on-condition setting unit that: sets the predetermined power-on condition to a first power-on condition, when the power-supply control unit sets the power supply to the off state because the first power-off condition is satisfied; and sets the predetermined power-on condition to a second power-on condition, when the power-supply control unit sets the power supply to the off state because the second power-off condition is satisfied, the second power-on condition being different from the first power-on condition; and
a user-getting-in recognizing unit that recognizes that the user is in the vehicle, wherein
the power-supply control unit sets the power supply to the on state when the first power-on condition or the second power-on condition is satisfied,
the power-on-condition setting unit sets the first power-on condition so that a first power-on operation is performed in a state in which the user-getting-in recognizing unit recognizes that the user is in the vehicle,
the CPU further includes a door-lock-unlocking recognizing unit that recognizes unlocking of a door lock mechanism provided in the vehicle, and
the power-on-condition setting unit sets the second power-on condition so that the door-lock-unlocking recognizing unit recognizes unlocking of the door lock mechanism.

2. The vehicle control device according to claim 1, wherein
the second power-on condition is different from the first power-on condition because a number of determination conditions which are conditions for determining to set the second power-on condition is smaller than a number of determination conditions which are conditions for determining to set the first power-on condition.

3. The vehicle control device according to claim 1, wherein
the CPU includes a parking-point recognizing unit that recognizes a parking point where the vehicle is stopped,
wherein the power-on-condition setting unit sets the second power-on condition such that: the parking-point recognizing unit recognizes that the parking point is at a place other than a home of the user; and that the door-lock-unlocking recognizing unit recognizes unlocking of the door lock mechanism.

4. The vehicle control device according to claim 1, wherein:
the power-on-condition setting unit transmits power-on-condition-setting information to a user terminal when the power-supply control unit sets the power supply to the off state because the second power-off condition is satisfied; and
the power-on-condition setting unit sets the predetermined power-on condition to the second power-on condition when setting-acceptance-information is received from the user terminal, the user terminal being used by the user, the power-on condition setting information inquiring whether to set the predetermined power-on condition to the second power-on condition, the setting-acceptance-information allowing setting of the second power-on condition.

5. The vehicle control device according to claim 1, wherein
the CPU includes a user recognizing unit that recognizes that the user or a user terminal used by the user exists within a predetermined range around the vehicle,
wherein the power-on-condition setting unit sets the second power-on condition to that the user recognizing unit recognizes that the user or the user terminal exists within the predetermined range.

6. The vehicle control device according to claim 1, wherein
when the power supply is set to the off state by the power-supply control unit because the second power-off condition is satisfied, and subsequently a second power-on operation is performed during a period from a time point when the power supply is set to the off state until a second predetermined time elapses, the power-supply control unit sets the power supply to the on state regardless of whether or not the user-getting-in recognizing unit recognizes that the user is in the vehicle.

7. The vehicle control device according to claim 6, wherein
the CPU includes a passenger recognizing unit that recognizes whether a passenger is in the vehicle,
wherein, when the power supply is set to the off state by the power-supply control unit because the second power-off condition is satisfied, and subsequently the passenger recognizing unit recognizes that the passenger is in the vehicle and the second power-on operation is performed during a period from a time point when the power supply is set to the off state until the second predetermined time elapses, the power-supply control unit sets the power supply to the on state regardless of whether or not the user-getting-in recognizing unit recognizes that the user is in the vehicle.

8. A vehicle control method that is executed by a computer, including a central processing unit (CPU), to control on and off of a power supply provided in a vehicle, the method comprising:

a power-supply control step that: sets the power supply to an on state when a predetermined power-on condition is satisfied; and sets the power supply to an off state when a first power-off condition or a second power-off condition is satisfied while the vehicle is stopped and the power supply is in the on state, the first power-off condition being a condition in which a predetermined power-off operation is performed by a user of the vehicle while the power supply is in the on state, the second power-off condition being a condition in which a first predetermined time elapses from a time when the user gets out of the vehicle while the power supply is in the on state;

a power-on-condition setting step that: sets the predetermined power-on condition to a first power-on condition, when the power-supply control step sets the power supply to the off state because the first power-off condition is satisfied; and sets the predetermined power-on condition to a second power-on condition, when the power-supply control step sets the power supply to the off state because the second power-off condition is satisfied, the second power-on condition being different from the first power-on condition; and a user-getting-in recognizing step that recognizes that the user is in the vehicle, wherein the power-supply control step sets the power supply to the on state when the first power-on condition or the second power-on condition is satisfied, the power-on-condition setting step sets the first power-on condition to that a first power-on operation is performed in a state in which the user-getting-in recognizing step recognizes that the user is in the vehicle, the method further includes a door-lock-unlocking recognizing step that recognizes unlocking of a door lock mechanism provided in the vehicle, and the power-on-condition setting step sets the second power-on condition to that the door-lock-unlocking recognizing step recognizes unlocking of the door lock mechanism.

9. A non-transient recording medium on which a vehicle control program is recorded, the vehicle control program causing a computer, including a central processing unit (CPU), to function to control on and off of a power supply provided in a vehicle, the computer functioning as:

a power-supply control unit that: sets the power supply to an on state when a predetermined power-on condition is satisfied; and sets the power supply to an off state when a first power-off condition or a second power-off condition is satisfied while the vehicle is stopped and the power supply is in the on state, the first power-off condition being a condition in which a predetermined power-off operation is performed by a user of the vehicle while the power supply is in the on state, the second power-off condition being a condition in which a first predetermined time elapses from a time when the user gets out of the vehicle while the power supply is in the on state;

a power-on-condition setting unit that: sets the predetermined power-on condition to a first power-on condition, when the power-supply control unit sets the power supply to the off state because the first power-off condition is satisfied; and sets the predetermined power-on condition to a second power-on condition, when the power-supply control unit sets the power supply to the off state because the second power-off condition is satisfied, the second power-on condition being different from the first power-on condition; and a user-getting-in recognizing unit that recognizes that the user is in the vehicle, wherein the power-supply control unit sets the power supply to the on state when the first power-on condition or the second power-on condition is satisfied, the power-on-condition setting unit sets the first power-on condition to that a first power-on operation is performed in a state in which the user-getting-in recognizing unit recognizes that the user is in the vehicle, the computer further functions as a door-lock-unlocking recognizing unit that recognizes unlocking of a door lock mechanism provided in the vehicle, and the power-on-condition setting unit sets the second power-on condition to that the door-lock-unlocking recognizing unit recognizes unlocking of the door lock mechanism.

* * * * *